US012261992B2

(12) United States Patent
Van Geest et al.

(10) Patent No.: US 12,261,992 B2
(45) Date of Patent: Mar. 25, 2025

(54) IMAGE SIGNAL REPRESENTING A SCENE

(71) Applicant: KONINKLIJKE PHILIPS N.V., Eindhoven (NL)

(72) Inventors: Bartholomeus Wilhelmus Damianus Van Geest, Veldhoven (NL); Bart Kroon, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 622 days.

(21) Appl. No.: 17/437,938

(22) PCT Filed: Feb. 14, 2020

(86) PCT No.: PCT/EP2020/053981
§ 371 (c)(1),
(2) Date: Sep. 10, 2021

(87) PCT Pub. No.: WO2020/187506
PCT Pub. Date: Sep. 24, 2020

(65) Prior Publication Data
US 2022/0174259 A1    Jun. 2, 2022

(30) Foreign Application Priority Data
Mar. 19, 2019  (EP) .................................. 19163678

(51) Int. Cl.
*H04N 13/282* (2018.01)
*G06T 5/50* (2006.01)
(Continued)

(52) U.S. Cl.
CPC .............. *H04N 13/282* (2018.05); *G06T 5/50* (2013.01); *G06T 15/205* (2013.01); *H04N 13/243* (2018.05); *H04N 13/275* (2018.05)

(58) Field of Classification Search
CPC ....... G06T 15/205; G06T 5/50; H04N 13/117; H04N 13/194; H04N 13/243;
(Continued)

(56) References Cited

U.S. PATENT DOCUMENTS 9,185,432 B2   11/2015  Benien et al.
9,986,258 B2    5/2018  Bruls et al.
(Continued)

FOREIGN PATENT DOCUMENTS

EP      2765774 A1      8/2014
EP      3441788 A1      2/2019
WO   2017204171 A2     11/2017

OTHER PUBLICATIONS

Online Literature, Wen-Neng Lai, Chapter 5: View synthesis techniques, Wen-Neng Lai, 2012.
(Continued)

Primary Examiner — Christopher S Kelley
Assistant Examiner — Ana Picon-Feliciano

(57) ABSTRACT

Generating an image signal comprises a receiver that receives source images representing a scene. A combined image generator generates combined images from the source images. Each combined image is derived from source images. An evaluator determines prediction quality measures for elements of the source images where the prediction quality measure for an element of a source image is indicative of a difference between pixel values in the source image and predicted pixel values for pixels in the element. The predicted pixel values are pixel values resulting from prediction of pixels from the combined images. A determiner determines low-quality segments of the source images comprising elements for which the prediction quality measure is indicative of a difference between the pixels that is above a threshold. An image signal generator generates an image
(Continued)

signal comprising image data representing the combined images and the low-quality segments of the source images.

19 Claims, 13 Drawing Sheets

(51) Int. Cl.
    *G06T 15/20*     (2011.01)
    *H04N 13/243*     (2018.01)
    *H04N 13/275*     (2018.01)

(58) Field of Classification Search
    CPC .. H04N 13/271; H04N 13/275; H04N 13/282; H04N 13/204; H04N 13/366
    USPC .......................................................... 348/47
    See application file for complete search history.

(56) References Cited

U.S. PATENT DOCUMENTS

| | | |
|---|---|---|
| 2011/0158507 A1 | 6/2011 | Dai et al. |
| 2016/0086336 A1* | 3/2016 | Lin .................... H04N 13/282 348/50 |
| 2016/0148433 A1* | 5/2016 | Petrovskaya ......... G02B 27/01 345/633 |
| 2017/0363949 A1* | 12/2017 | Valente ................ H04N 13/204 |
| 2018/0205926 A1 | 7/2018 | Mogalapalli et al. |
| 2020/0005521 A1* | 1/2020 | Youngquist .............. G06T 7/70 |

OTHER PUBLICATIONS

Online Literature, Jiheng Wang; Shiqi Wang; Kai Zeng; Zhou Wang, Quality assessment of multi-viewplus-depth images, IEEE, Jul. 10-14, 2017, https://ieeexplore.ieee.org/stamp/stamp.jsp?tp=&arnumber=8019542.
"Equirectangular Projection" Downloaded From Wikipedia Aug. 24, 2021.
"Rendering Omni-Directional Stereo Content" Google Inc. downloaded Aug. 24, 2021.
"How to:ODS" from wiki.povray.org downloaded Aug. 24, 2021.
"VMRL" from Wikipedia downloaded Aug. 24, 2021.
Sun et al "An Overview of Free Viewpoint Depth-Image Based Rendering (DIBR) " Proceedings of the Second APSIPA Annual Summit and Conf. p. 1023-1030 (Dec. 14-17, 2010).
Wang et al "Quality Assessment of Multi-View Plus Depth Images" 2017 IEEE International Conference on Multimedia and Expo, IEEE, Jul. 10, 2017 p. 85-90.
International Search Report and Written Opinion From PCT/EP2020/053981 Mailed Sep. 24, 2020.

* cited by examiner

500

IMAGE SIGNAL REPRESENTING A SCENE

CROSS-REFERENCE TO PRIOR APPLICATIONS

This application is the U.S. National Phase application under 35 U.S.C. § 371 of International Application No. PCT/EP2020/053981, filed on Feb. 14, 2020, which claims the benefit of EP Patent Application No. EP 19163678.6, filed on Mar. 19, 2019. These applications are hereby incorporated by reference herein.

FIELD OF THE INVENTION

The invention relates to an image signal representing a scene and in particular, but not exclusively, to generation of an image signal representing a scene and rendering of images from this image signal as part of a virtual reality application.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to e.g. (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in that they are based on a predetermined model of the scene, and typically on an artificial model of a virtual world. It is often desirable for a virtual reality experience to be provided based on real world capture. However, in many cases such an approach is restricted or tends to require that a virtual model of the real world is built from the real world captures. The virtual reality experience is then generated by evaluating this model.

However, the current approaches tend to be suboptimal and tend to often have a high computational or communication resource requirement and/or provide a suboptimal user experience with e.g. reduced quality or restricted freedom.

In many systems, such as specifically when based on a real world scene, an image representation of the scene is provided where the image representation includes images and depth for one or more capture points/view points in the scene. Image plus depth representation provides a very efficient characterization of, in particular, a real world scene where the characterization is not only relatively easy to generate by capture of the real world scene but is also highly suitable for a renderer synthesizing views for other viewpoints than those captured. For example, a renderer may be arranged to dynamically generate views that match a current local viewer pose. E.g., a viewer pose may dynamically be determined, and views dynamically generated to match this viewer pose based on the images and e.g. depth maps provided.

However, such image representations tend to result in a very high data rate for a given image quality. In order to provide a good capture of the scene and specifically to address occlusion phenomena, it is desired that the scene is captured from capture positions both close to each other and covering a large range of positions. Accordingly, a relatively high number of images are desired. Further, the capture viewports for the cameras are often overlapping and therefore the set of images tend to include a large amount of redundant information. Such issues tend to be independent of the specific capture configuration and specifically on whether linear or e.g. circular capture configurations are used.

Thus, whereas many of the conventional image representations and formats may provide good performance in many applications and services, they tend to be suboptimal in at least some circumstances.

Hence, an improved approach for processing and generating an image signal comprising an image representation of a scene would be advantageous. In particular, a system and/or approach that allows improved operation, increased flexibility, an improved virtual reality experience, reduced data rates, increased efficiency, facilitated distribution, reduced complexity, facilitated implementation, reduced storage requirements, increased image quality, improved rendering, an improved user experience, improved trade-off between image quality and data rate, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided an apparatus for generating an image signal, the apparatus comprising: a receiver for receiving a plurality of source images representing a scene from different view poses; a combined image generator for generating a plurality of combined images from the source images, each combined image being derived from a set of at least two source images of the plurality of source images, each pixel of a combined image representing the scene for a ray pose and the ray poses for each combined image including at least two different positions, a ray pose for a pixel representing a pose for a ray in a view direction for the pixel and from a view position for the pixel; an evaluator for determining prediction quality measures for elements of the plurality of source images, a prediction quality measure for an element of a first source image being indicative of a difference between pixel values in the first source image for pixels in the element and predicted pixel values for pixels in the element, the predicted pixel values being pixel values resulting from prediction of pixels in the element from the plurality of combined images; a determiner for determining segments of the source images comprising elements for which the prediction quality measure is indicative of a difference above a threshold; and an image signal generator for generating an image signal comprising image data representing the combined images and image data representing the segments of the source images.

The invention may provide an improved representation of a scene and may provide an improved image quality of rendered images versus data rate of the image signal in many embodiments and scenarios. In many embodiments, a more efficient representation of a scene can be provided, e.g. allowing a given quality to be achieved by a reduced data rate. The approach may provide a more flexible and efficient approach for rendering images of a scene and may allow improved adaptation to e.g. the scene properties.

The approach may in many embodiments employ an image representation of a scene suitable for a flexible, efficient, and high performance Virtual Reality (VR) application. In many embodiments, it may allow or enable a VR application with a substantially improved trade-off between image quality and data rate. In many embodiments, it may allow an improved perceived image quality and/or a reduced data rate.

The approach may be suited to e.g. broadcast video services supporting adaptation to movement and head rotation at the receiving end.

The source images may specifically be light intensity images with associated depth information, such as depth maps.

The approach may in particular allow combined images to be optimized for respectively foreground and background information with the segments providing additional data where specifically appropriate.

The image signal generator may be arranged to use a more efficient encoding of the combined images than of the segments. However, the segments may typically represent a relatively small proportion of the data of the combined images.

According to an optional feature of the invention, the combined image generator is arranged to generate at least a first combined image of the plurality of combined images by view synthesis of pixels of the first combined image from the plurality of source images, where each pixel of the first combined image represents the scene for a ray pose and the ray poses for the first image comprises at least two different positions.

This may provide particularly advantageous operation in many embodiments, and may e.g. allow the combined images to be generated for view poses where they may (typically in combination) provide a particularly advantageous representation of the scene.

According to an optional feature of the invention, a dot product between a vertical vector and pixel cross product vectors is non-negative for at least 90% of pixels of the first combined image, a pixel cross product vector for a pixel being a cross product between a ray direction for a pixel and a vector from a center point for the different view poses to a ray position for the pixel.

This may provide a particularly efficient and advantageous generation of combined images in many embodiments. It may in particular provide a low complexity approach for determining a combined image which provides an advantageous representation of background data by tending to provide a view biased towards a sideways view.

According to an optional feature of the invention, the combined image generator is arranged to generate a second combined image of the plurality of combined images by view synthesis of pixels of the second combined image from the plurality of source images, where each pixel of the second combined image represents the scene for a ray pose and the ray poses for the second image comprises at least two different positions; and wherein a dot product between the vertical vector and pixel cross product vectors is non-positive for at least 90% of pixels of the second combined image.

This may provide a particularly efficient and advantageous generation of combined images in many embodiments. It may in particular provide a low complexity approach for determining a combined image which provides an advantageous representation of background data by tending to provide a views biased towards different sideways views. According to an optional feature of the invention, the ray poses of the first combined image are selected to be proximal to a border of a region comprising the different view poses of the plurality of source images.

This may provide advantageous operation in many embodiments and may e.g. provide improved background information by the image signal thereby facilitating and/or improving view synthesis based on the image signal.

According to an optional feature of the invention, each of the ray poses of the first combined image is determined to be less than a first distance from a border of a region comprising the different view poses of the plurality of source images, the first distance being no more than 50% of a maximum interior distance between points on the border.

This may provide advantageous operation in many embodiments and may e.g. provide improved background information by the image signal thereby facilitating and/or improving view synthesis based on the image signal. In some embodiments, the first distance is no more than 25% or 10% of the maximum interior distance.

In some embodiments at least one view pose of the combined images is determined to be less than a first distance from a border of a region comprising the different view poses of the plurality of source images, the first distance being no more than 20%, 10%, or even 5% of a maximum distance between two view poses of the different view poses.

In some embodiments at least one view pose of the combined images is determined to be at least a minimum distance from a center point of the different view poses, the minimum distance being at least 50%, 75%, or even 90% of a distance from the center point to a border of a region comprising the different view poses of the plurality of source images along a line through the center point and the at least one view pose.

According to an optional feature of the invention, the combined image generator is arranged to for each pixel of a first combined image of the plurality of combined images: determine a corresponding pixel in each of the view source images for which a corresponding pixel is present, a corresponding pixel being one that represents a same ray direction as the pixel of the first combined image; select a pixel value for the pixel of the first combined image as a pixel value of the corresponding pixel in the view source image for which the corresponding pixel represents a ray having a largest distance from a center point for the different view poses, the largest distance being in a first direction along a first axis perpendicular to a ray direction for the corresponding pixel.

This may provide a particularly efficient and advantageous generation of combined images in many embodiments. It may in particular provide a low complexity approach for determining a combined image which provides an advantageous representation of background data by tending to provide a view biased towards a sideways view.

According to an optional feature of the invention, the corresponding pixels comprises resampling each source image to an image representation representing at least a part of a surface of a view sphere surrounding the view poses and determining corresponding pixels as pixels having a same position in the image representation.

This may provide a particularly efficient and accurate determination of corresponding pixels.

The view sphere surface may e.g. be represented by an equirectangular or cube map representation. Each pixel of the view sphere may have a ray direction and resampling a source image may include setting a pixel value of the view sphere to the pixel value of the source image for which the ray direction is the same.

According to an optional feature of the invention, the combined image generator is arranged to for each pixel of a second combined image: select a pixel value for the pixel in the second combined image as a pixel value of the corresponding pixel in the view source image for which the corresponding pixel represents a ray having a largest distance from the center point in an opposite direction of the first direction.

This may provide a particularly efficient and advantageous generation of combined images in many embodiments. It may in particular provide a low complexity approach for determining a combined image which provides an advantageous representation of background data by tending to provide a view biased towards a sideways view. Further, the second combined image may complement the first combined image by providing a sideways view from an opposite direction thereby combining with the first combined image to provide a particularly advantageous representation of the scene and specifically of background information.

According to an optional feature of the invention, the combined image generator is arranged to: for each pixel a third combined image: select a pixel value for the pixel in the third combined image as a pixel value of the corresponding pixel in the view source image for which the corresponding pixel represents a ray having a smallest distance from the center point.

This may provide a particularly efficient and advantageous generation of combined images in many embodiments. The third combined image may complement the first (and second) combined image(s) by providing a more frontal view of the scene which may provide improved representation of foreground objects in the scene.

According to an optional feature of the invention, the combined image generator is arranged to: for each pixel in a fourth combined image: select a pixel value for the pixel in the fourth combined image as a pixel value of the corresponding pixel in the view source image for which the corresponding pixel represents a ray having a largest distance from the center point a second direction along a second axis perpendicular to a ray direction for the corresponding pixel, the first axis and the second axis having different directions.

This may provide a particularly efficient and advantageous generation of combined images in many embodiments, and may provide an improved representation of the scene.

According to an optional feature of the invention, the combined image generator is arranged to generate origin data for the first combined image, the origin data being indicative of which of the source images is an origin for each pixel of the first combined image; and the image signal generator is arranged to include the origin data in the image signal.

This may provide particularly advantageous operation in many embodiments.

According to an optional feature of the invention, the image signal generator is arranged to include source view pose data in the image signal, the source view pose data being indicative of the different view poses for the source images.

This may provide particularly advantageous operation in many embodiments.

According to an aspect of the invention, there is provided an apparatus for receiving an image signal, the apparatus comprising: a receiver for receiving an image signal, the image signal comprising: a plurality of combined images, each combined image representing image data derived from a set of at least two source images of a plurality of source images representing a scene from different view poses, each pixel of a combined image representing the scene for a ray pose and the ray poses for each combined image including at least two different positions, a ray pose for a pixel representing a pose for a ray in a view direction for the pixel and from a view position for the pixel; image data for a set of segments of the plurality of source images, a segment for a first source image comprising at least one pixel of the first source image for which a prediction quality measure for a prediction of the segment from the plurality of combined images is below a threshold; and a processor for processing the image signal.

According to an aspect of the invention, there is provided a method of generating an image signal, the method comprising: receiving a plurality of source images representing a scene from different view poses; generating a plurality of combined images from the source images, each combined image being derived from a set of at least two source images of the plurality of source images, each pixel of a combined image representing the scene for a ray pose and the ray poses for each combined image including at least two different positions, a ray pose for a pixel representing a pose for a ray in a view direction for the pixel and from a view position for the pixel; determining prediction quality measures for elements of the plurality of source images, a prediction quality measure for an element of a first source image being indicative of a difference between pixel values in the first source image for pixels in the element and predicted pixel values for pixels in the element, the predicted pixel values being pixel values resulting from prediction of pixels in the element from the plurality of combined images; determining segments of the source images comprising elements for which the prediction quality measure is indicative of a difference above a threshold; and generating an image signal comprising image data representing the combined images and image data representing the segments of the source images.

According to an aspect of the invention, there is provided a method of processing an image signal, the method comprising: receiving an image signal, the image signal comprising: a plurality of combined images, each combined image representing image data derived from a set of at least two source images of a plurality of source images representing a scene from different view poses, each pixel of a combined image representing the scene for a ray pose and the ray poses for each combined image including at least two different positions, a ray pose for a pixel representing a pose for a ray in a view direction for the pixel and from a view position for the pixel; image data for a set of segments of the plurality of source images, a segment for a first source image comprising at least one pixel of the first source image for which a prediction quality measure for a prediction of the segment from the plurality of combined images is below a threshold; and processing the image signal. According to an aspect of the invention, there is provided an image signal comprising: a plurality of combined images, each combined image representing image data derived from a set of at least two source images of a plurality of source images representing a scene from different view poses, each pixel of a combined image representing the scene for a ray pose and the ray poses for each combined image including at least two different positions, a ray pose for a pixel representing a pose for a ray in a view direction for the pixel and from a view position for the pixel; image data for a set of segments of the plurality of source images, a segment for a first source image comprising at least one pixel of the first source image for which a prediction quality measure for a prediction of the segment from the plurality of combined images is below a threshold.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
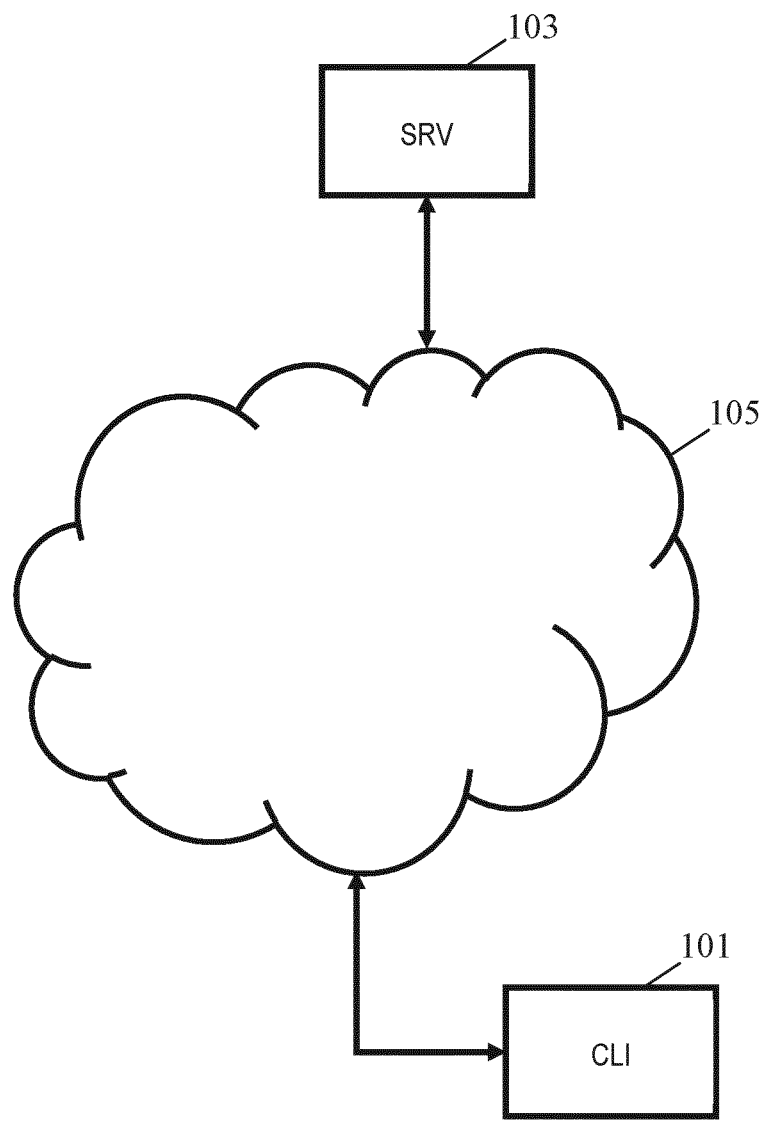
FIG. 1 illustrates an example of an arrangement for providing a virtual reality experience.

Virtual experiences allowing a user to move around in a virtual world are becoming increasingly popular and services are being developed to satisfy such a demand. However, provision of efficient virtual reality services is very challenging, in particular if the experience is to be based on a capture of a real-world environment rather than on a fully virtually generated artificial world.

In many virtual reality applications, a viewer pose input is determined reflecting the pose of a virtual viewer in the scene. The virtual reality apparatus/system/application then generates one or more images corresponding to the views and viewports of the scene for a viewer corresponding to the viewer pose.

Typically, the virtual reality application generates a three-dimensional output in the form of separate view images for the left and the right eyes. These may then be presented to the user by suitable means, such as typically individual left and right eye displays of a VR headset. In other embodiments, the image may e.g. be presented on an autostereoscopic display (in which case a larger number of view images may be generated for the viewer pose), or indeed in some embodiments only a single two-dimensional image may be generated (e.g. using a conventional two-dimensional display).

The viewer pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the movement of the VR headset.

In some systems, the viewer pose may be provided by manual means, e.g. by the user manually controlling a joystick or similar manual input. For example, the user may manually move the virtual viewer around in the scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

The generation of images is based on a suitable representation of the virtual world/environment/scene. In some applications, a full three-dimensional model may be provided for the scene and the views of the scene from a specific viewer pose can be determined by evaluating this model.

In many practical systems, the scene may be represented by an image representation comprising image data. The image data may typically comprise images associated with one or more capture or anchor poses, and specifically images may be included for one or more view ports with each view port corresponding to a specific pose. An image representation may be used comprising one or more images where each image represents the view of a given view port for a given view pose. Such view poses or positions for which image data is provided are often referred to as anchor poses or positions or capture poses or positions (since the image data may typically correspond to images that are or would be captured by cameras positioned in the scene with the position and orientation corresponding to the capture pose).

Many typical VR applications may on the basis of such an image representation proceed to provide view images corresponding to viewports for the scene for the current viewer pose with the images being dynamically updated to reflect changes in the viewer pose and with the images being generated based on the image data representing the (possibly) virtual scene/environment/world. The application may do this by performing view synthesis and view shift algorithms as will be known to the skilled person. In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A pose may be at least one of an orientation and a position. A pose value may be indicative of at least one of an orientation value and a position value.

A system or entity based on providing the maximum degree of freedom for the viewer is typically referred to as having 6 Degrees of Freedom (6DoF). Many systems and entities provide only an orientation or position, and these are typically known as having 3 Degrees of Freedom (3DoF).

In some systems, the VR application may be provided locally to a viewer by e.g. a stand-alone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene. The view images are then transmitted to the device local to the viewer where they are presented. For example, the remote device may directly generate a video stream (typically a stereo/3D video stream) which is directly presented by the local device. Thus, in such an example, the local device may not perform any VR processing except for transmitting movement data and presenting received video data.

In many systems, the functionality may be distributed across a local device and remote device. For example, the local device may process received input and sensor data to generate viewer poses that are continuously transmitted to the remote VR device. The remote VR device may then generate the corresponding view images and transmit these to the local device for presentation. In other systems, the remote VR device may not directly generate the view images but may select relevant scene data and transmit this to the local device which may then generate the view images that are presented. For example, the remote VR device may identify the closest capture point and extract the corresponding scene data (e.g. spherical image and depth data from the capture point) and transmit this to the local device. The local device may then process the received scene data to generate the images for the specific, current view pose. The view pose will typically correspond to the head pose, and references to the view pose may typically equivalently be considered to correspond to the references to the head pose.

In many applications, especially for broadcast services, a source may transmit scene data in the form of an image (including video) representation of the scene which is independent of the viewer pose. For example, an image representation for a single view sphere for a single capture position may be transmitted to a plurality of clients. The individual clients may then locally synthesize view images corresponding to the current viewer pose.

An application which is attracting particular interest is where a limited amount of movement is supported such that the presented views are updated to follow small movements and rotations corresponding to a substantially static viewer making only small head movements and rotations of the head. For example, a viewer sitting down can turn his head and move it slightly with the presented views/images being adapted to follow these pose changes. Such an approach may provide a highly and immersive e.g. video experience. For example, a viewer watching a sports event may feel that he is present at a particular spot in the arena.

Such limited freedom applications have the advantage of providing an improved experience while not requiring an accurate representation of a scene from many different positions thereby substantially reducing the capture requirements. Similarly, the amount of data that needs to be provided to a renderer can be reduced substantially. Indeed, in many scenarios, only image and typically depth data for a single viewpoint need to be provided with the local renderer being able to generate the desired views from this. The approach may specifically be highly suitable for applications where the data needs to be communicated from a source to a destination over a bandlimited communication channel, such as for example for a broadcast or client server application.

FIG. 1 illustrates such an example of a VR system in which a remote VR client device 101 liaises with a VR server 103 e.g. via a network 105, such as the Internet. The server 103 may be arranged to simultaneously support a potentially large number of client devices 101.

The VR server 103 may for example support a broadcast experience by transmitting an image signal comprising an image representation in the form of image data that can be used by the client devices to locally synthesize view images corresponding to the appropriate poses.

In many applications, such as that of FIG. 1, it may thus be desirable to capture a scene and generate an efficient image representation that can be efficiently included in an image signal. The image signal can then be transmitted to various devices which can locally synthesize views for other view poses than the capture poses. In order to do so, the image representation may typically include depth information, and for example images with associated depth may be provided. For example, depth-maps may be obtained using stereo capture in combination with disparity estimation or using range sensors, and these depth maps may be provided with the light intensity images.

However, a particular issue for such approaches is that changing the view pose may change the occlusion characteristics resulting in background segments that are not visible in a given captured image becoming visible for the different view pose.

Figure 2:
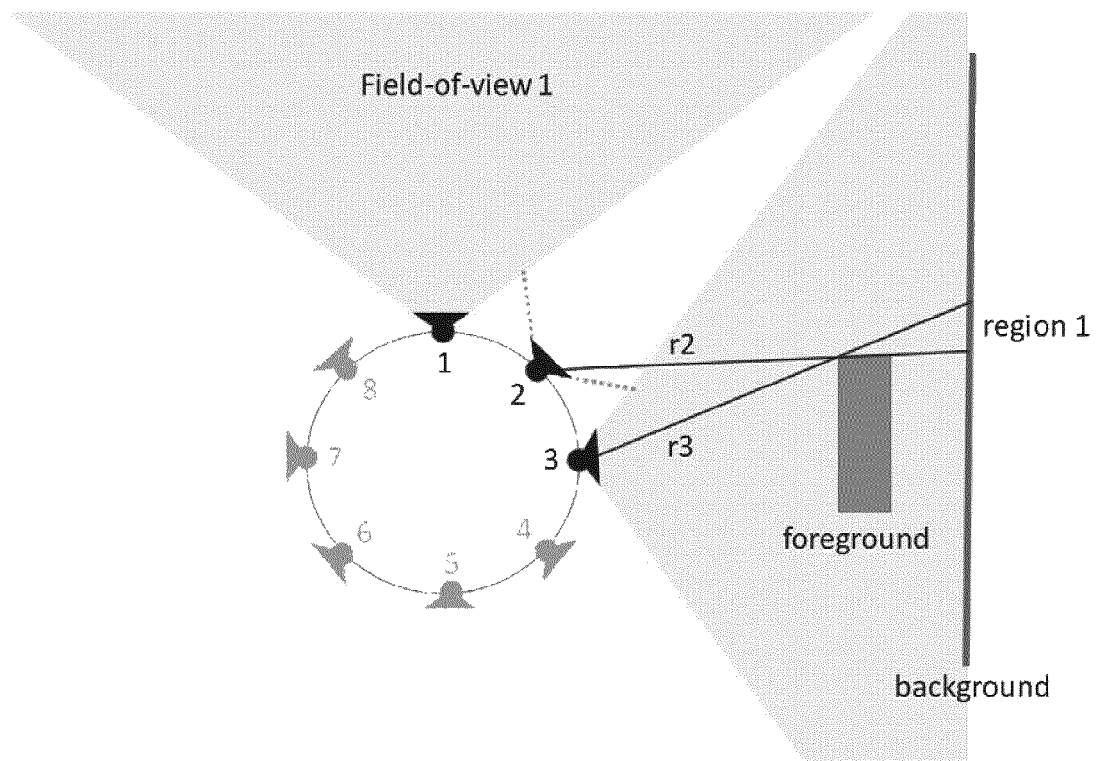
FIG. 2 illustrates an example of a capture arrangement for a scene.

In order to address this, a relatively large number of cameras are often used to capture a scene. FIG. 2 shows an example of a capture by a circular 8-view camera rig. In the example, cameras are facing outward. As can be seen, different cameras, and thus different capture/source images, may have visibility of different parts of the scene. For example, background region 1 is only visible from camera 2. However, as can also be seen a lot of the scene is visible from multiple cameras, and thus a significant amount of redundant information is created.

Figure 3:
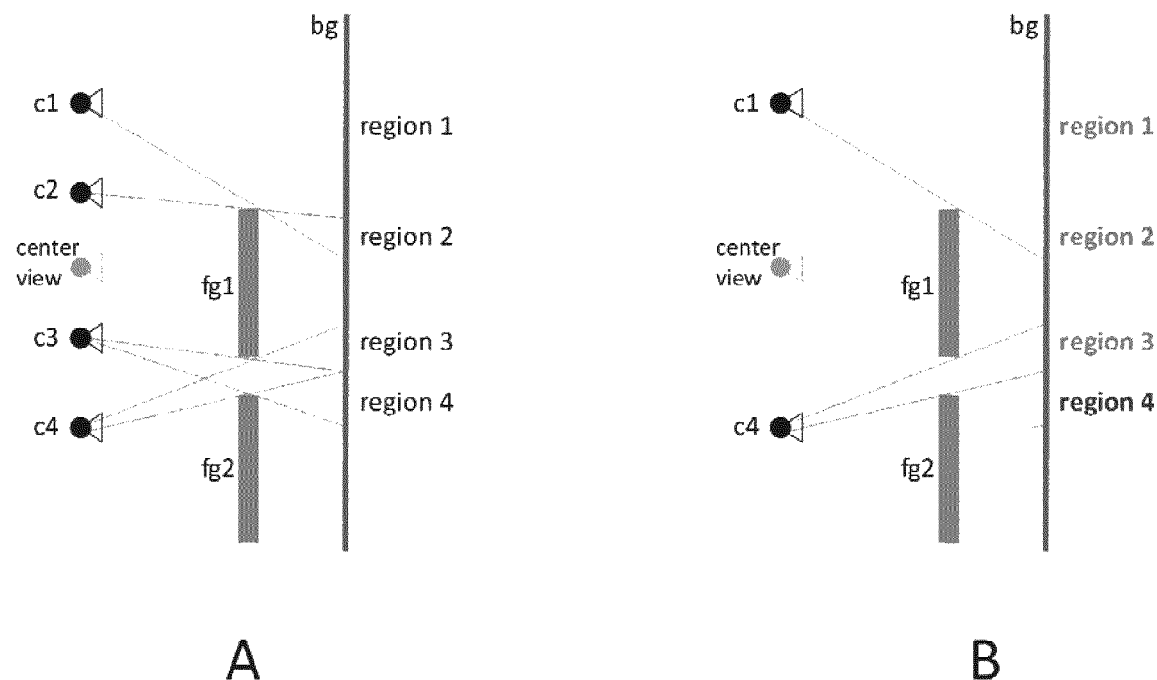
FIG. 3 illustrates an example of a capture arrangement for a scene.

FIG. 3 shows an example of a linear set of cameras. Again, the cameras provide information of different parts of the scene, e.g. c1 is the only camera capturing region 2, c3 is the only camera capturing region 4, and c4 is the only camera capturing region 3. At the same time, some parts of the scene are captured by more than one of the cameras. For example, all cameras capture the front of the foreground objects fg1 and fg2 with some cameras providing a better capture than others. FIG. 3 shows an example A for four cameras and an example B for two cameras. As can be seen, the four camera setup provides a better capture including capturing part of the scene (region 4 of the background bg) but of course also generates a larger amount of data including more redundant data.

A disadvantage of a multi-view capture with respect to a single center-view is obviously the increased amount of image data. Another disadvantage is the vast amount of pixels generated, i.e. the pixel-rate that need to be processed and which the decoder need to produce. This also requires increased complexity and resource usage for view-synthesis during playback.

In the following, a specific approach will be described that uses a more efficient and less redundant image representation of the captured views. It seeks to preserve some spatial and temporal coherence of image data enabling video coders to be more efficient. It reduces bit-rate, pixel-rate and the complexity of view-synthesis at the playback site.

This representation comprises a plurality of combined images each of which is generated from two or more of the source images (which specifically may be captured 3D images e.g. represented as image plus depth map) with typically only part of each of the source images being considered. The combined images may provide a reference for view synthesis and provide substantial scene information. The combined images may be generated to be biased towards more external views of the scene, and specifically towards the borders of the capture region. In some embodiments, one or more central combined images may also be provided.

In many embodiments, each of the combined images represents views from different view positions, i.e. each image may comprise at least pixels that correspond to different view/capture/anchor poses. Specifically, each pixel of a combined image may represent a ray pose corresponding to an origin/position and a direction/orientation for a ray from that origin/position aimed in that direction/orientation and ending on the scene point/object that is represented by the pixel value for that pixel. At least two pixels of a combined image may have different ray origins/positions. For example, in some embodiments, the pixels of a combined image may be divided into N groups with all pixels in a group having the same ray origin/position but with this being different for the individual groups. N may be two or larger. In some embodiments, N may be equal to the maximum number of horizontal pixels in a row (and/or to the number of columns in the combined image), and indeed in some embodiments, N may be equal to the number of pixels, i.e. all pixels may have a unique ray origin/pose.

A ray pose for a pixel may thus represent an origin/position, and/or an orientation/direction for a ray between the origin/position and the scene point represented by the pixel. The origin/position may specifically be a view position for the pixel and the orientation/direction may be the view direction for the pixel. It may effectively represent the light ray that would be captured at the ray position from the ray direction for the pixel, and thus reflects the light ray that is represented by the pixel value.

Each pixel may thus represent the scene as seen from a view position in a view direction. The view position and the view direction accordingly define a ray. Each pixel may have an associated viewing ray from the view position for the pixel and in the view direction for the pixel. Each pixel represents the scene for a (view) ray pose being the pose of a ray from a viewpoint/position for the pixel and in a view direction. The pixel may specifically represent the scene point (point in the scene) where the view ray intersects a scene object (including the background). A pixel may represent light rays from a scene point to the view position and in the view direction. The view ray may be a ray from the view position in the direction intersecting the scene point.

In addition, the combined images are supplemented by segments or fragments of the captured views that have been identified as not sufficiently well predicted from the combined images. Thus, a number, and typically a relatively high number, of, typically small, segments are defined and included to specifically represent individual parts of the captured images that may provide information on elements of the scene not sufficiently well represented by the combined images.

An advantage of this representation is that different encodings may be provided to different parts of the image data to be transmitted. For example, efficient and complex encoding and compression may be applied to the combined images as this will tend to make up the largest part of the image signal whereas a less efficient encoding can often be applied to the segments. Further, the combined images can be generated to be highly suitable for efficient encoding, e.g. by being generated to be similar to conventional images thereby allowing efficient image encoding approaches to be used. In contrast, the properties of the segments may vary a lot more depending on the specific characteristics of the images and thus may be more difficult to encode as efficiently. However, this is not an issue as the segments tend to provide much less image data.

Figure 4:
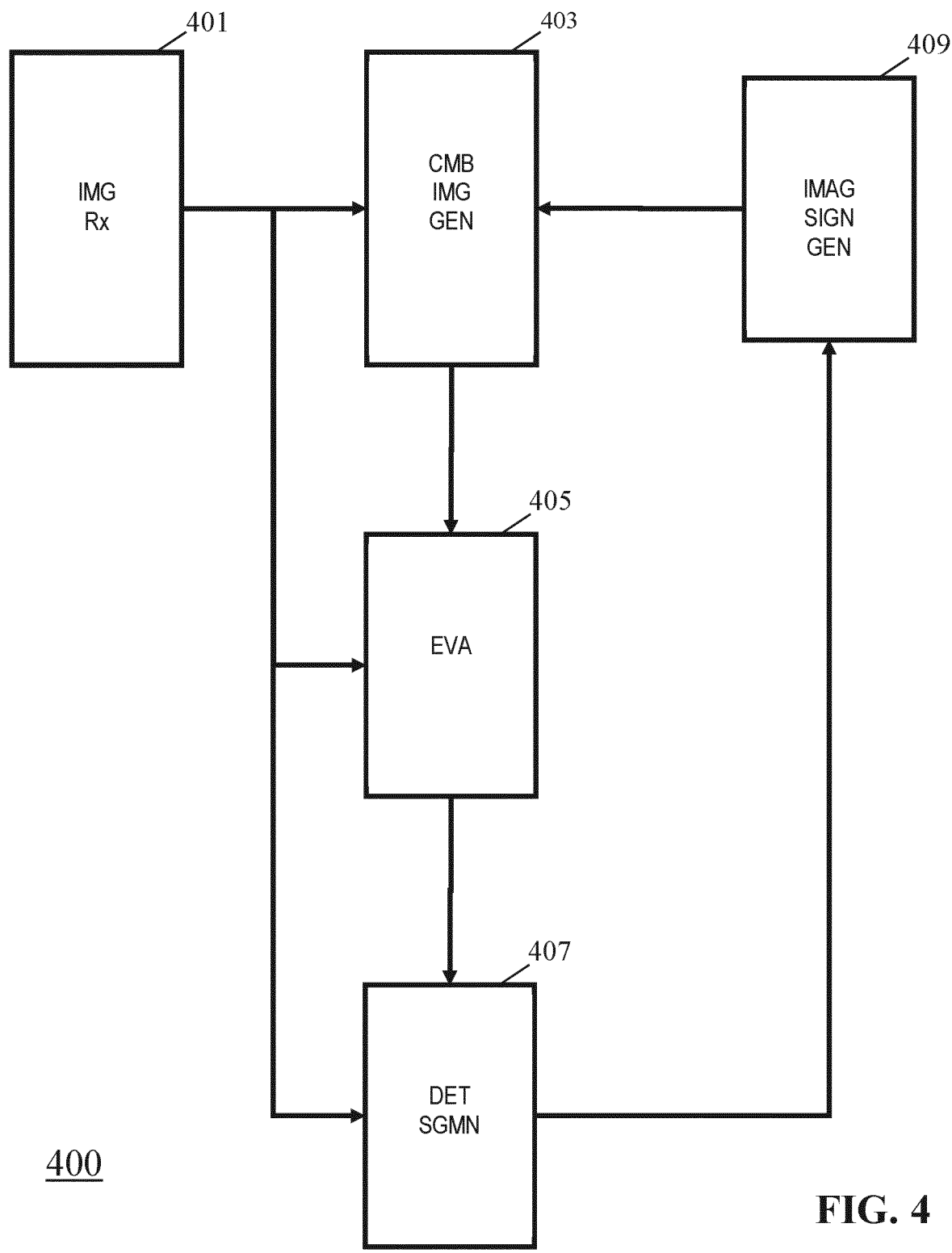
FIG. 4 illustrates an example of elements of an apparatus in accordance with some embodiments of the invention.

FIG. 4 illustrates an example of an apparatus for generating an image signal which includes a representation of a plurality of source images of the scene from different source view poses (anchor poses) as described above. The apparatus will also be referred to as an image signal transmitter 400. The image signal transmitter 400 may for example be comprised in the VR server 103 of FIG. 1.

Figure 5:
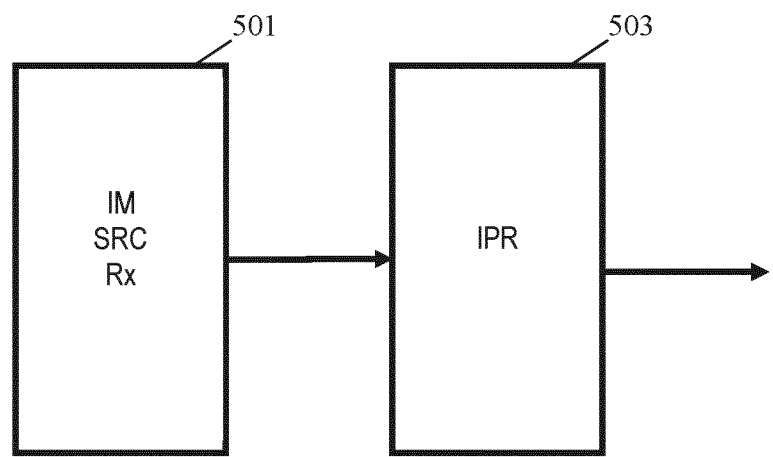
FIG. 5 illustrates an example of elements of an apparatus in accordance with some embodiments of the invention.

FIG. 5 illustrates an example of an apparatus for rendering view images based on a received image signal which includes a representation of a plurality of images of the scene. The apparatus may specifically receive the image data signal generated by the apparatus of FIG. 4 and proceed to process this in order to render images for specific view poses. The apparatus of FIG. 5 will also be referred to as an image signal receiver 500. The image signal receiver 500 may for example be comprised in the client device 101 of FIG. 1.

The image signal transmitter 400 comprises an image source receiver 401 which is arranged to receive a plurality of source images of the scene. The source images may represent views of the scene from different view poses. The source images may typically be captured images, e.g. captured by cameras of a camera rig. The source images may e.g. comprise images from a row of equidistant capture cameras or from a ring of cameras.

In many embodiments, the source images may be 3D images comprising 2D images with associated depth information. The 2D images may specifically be view images for viewports of the scene from the corresponding capture pose, and the 2D image may be accompanied by a depth image or map comprising depth values for each of the pixels of the 2D image. The 2D image may be a texture map. The 2D image may be a light intensity image.

The depth values may for example be disparity values or distance values, e.g. indicated by a z-coordinate. In some embodiments, a source image may be a 3D image in the form of a texture map with an associated 3D mesh. In some embodiments, such texture maps and mesh representations may be converted into image plus depth representations by the image source receiver before further processing by the image signal transmitter 400.

The image source receiver 401 accordingly receives a plurality of source images that characterize and represent the scene from different source view poses. Such a set of source images will allow view images to be generated for other poses using algorithms such as view shifting as will be known to the skilled person. Accordingly, the image signal transmitter 400 is arranged to generate an image signal that comprises image data for the source images and transmit this data to a remote device for local rendering. However, directly transmitting all the source images will require an unfeasibly high data rate and will comprise a large amount of redundant information. The image signal transmitter 400 is arranged to reduce the data rate by using an image representation as previously described.

Specifically, the input source receiver 401 is coupled to a combined image generator 403 which is arranged to generate a plurality of combined images. The combined images comprise information derived from a plurality of the source images. The exact approach for deriving the combined images may differ between different embodiments, and specific examples will be described in more detail later. In some embodiments, a combined image may be generated by selection of pixels from different source images. In other embodiments, the combined images may alternatively or additionally generate one or more of the combined images by view synthesis from the source images.

However, whereas each combined image includes a contribution from at least two, and often more, of the source images, typically only part of the individual source images is considered for each combined image. Thus, for each source image used to generate a given combined image, there are some pixels which are excluded/discarded. Thus, the pixel values generated for the specific combined image do not depend on the pixel values of these pixels.

The combined images may be generated such that each image does not merely represent one view/capture/anchor position but rather represents two or more view/capture/anchor position. Specifically, the ray origin/position for at least some pixels in one combined image will be different and thus one combined image may represent a view of the scene from different directions.

The combined image generator 403 may accordingly be arranged to generate a plurality of combined images from the source images where each combined image is derived from a set of at least two source images, and where typically the derivation of a first combined image includes only a part of each of these at least two source images. Further, each pixel of a given combined image represents the scene for a ray pose and the ray poses for each combined image may comprise at least two different positions.

The combined image generator 403 is coupled to an evaluator 405 which is fed the combined images and the source images. The evaluator 405 is arranged to determine prediction quality measures for elements of the source images. An element may be an individual pixel and the evaluator 405 may be arranged to determine a prediction quality measure for each pixel of each source image. In other embodiments, elements may comprise a plurality of pixels and each element may be a group of pixels. For example, a prediction quality measure may be determined for blocks of e.g. 4×4 or 16×16 blocks of pixels. This may reduce the granularity of the segments or fragments being determined but may substantially reduce the processing complexity and resource usage.

The prediction quality measure for a given element is generated to be indicative of a difference between pixel values in the first source image for pixels in the element and predicted pixel values for pixels in the element. Thus, an element may be made up by one or more pixels and the prediction quality measure for the element may be indicative of the difference between the pixel values for those pixels in the original source image and the pixel values for the pixels that would result from a prediction from the combined images.

It will be appreciated that different approaches for determining prediction quality measures may be used in different embodiments. Specifically, in many embodiments, the evaluator 405 may proceed to actually perform a prediction of each of the source images from the combined images. It may then for each individual image and each individual pixel determine the difference between the original pixel value and the predicted pixel value. It will be appreciated that any suitable difference measure can be used, such as e.g. a simple absolute difference, a sum square root difference applied to the pixel value components of e.g. multiple color channels, etc.

Such a prediction may thus emulate the prediction/view synthesis that may be performed by the image signal receiver 500 to generate views for the view poses of the source images. The prediction quality measures thus reflect how well a receiver of the combined images may be able to generate the original source images based only on the combined images.

A predicted image for a source image from the combined images may be an image for the view pose of the source image generated by view synthesis from the combined images. The view synthesis typically includes a view pose shift, and typically a view position shift. The view synthesis may be a view shift image synthesis.

A prediction of a first image from a second image may specifically be a view synthesis of an image at the view pose of the first image based on the second image (and the view pose of this). Thus, a prediction operation to predict a first image from a second image may be a view pose shift of the second image from the view pose associated with this to the view pose of the first image.

It will be appreciated that different methods and algorithms for view synthesis and prediction may be used in different embodiments. In many embodiments, a view synthesis/prediction algorithm may be used which as an input takes a synthesis view pose for which the synthesized image is to be generated, and a plurality of input images each of which is associated with a different view pose. The view synthesis algorithm may then generate the synthesized image for this view pose based on the input images that may typically include both a texture map and depth.

A number of such algorithms are known, and any suitable algorithm may be used without detracting from the Invention. As an example of such an approach, intermediate synthesis/prediction images may first be generated for each input image. This may for example be achieved by first generating a mesh for the input image based on the depth map of the image. The mesh may then be warped/shifted from the view pose of the input image to the synthesis view pose based on geometric calculations. The vertices of the resulting mesh may then be projected onto the intermediate synthesis/prediction image and the texture map may be overlaid this image. Such a process may for example be implemented using vertex processing and fragment shaders known from e.g. standard graphic pipelines.

In this way, an intermediate synthesis/prediction image (henceforth just intermediate prediction image) for the synthesis view pose may be generated for each of the input images.

The intermediate prediction images may then be combined together, e.g. by a weighted combination/summation or by a selection combining. For example, in some embodiments, each pixel of the synthesis/prediction image for the synthesis view pose may be generated by selecting the pixel from the intermediate prediction image which is furthest forward, or the pixel may be generated by a weighted summation of the corresponding pixel value for all the intermediate prediction images where the weight for a given intermediate prediction image depends on the depth determined for that pixel. The combination operation is also known as a blending operation.

In some embodiments, the prediction quality measures may be performed without performing a full prediction but rather an indirect measure of the prediction quality may be used.

The prediction quality measure may for example be determined indirectly by evaluating a parameter of the process involved in the view shift. For example, the amount of geometric distortion (stretch) that results to a primitive (typically a triangle) when performing the view pose shift. The larger the geometric distortion, the lower the prediction quality measure for any pixel represented by this primitive.

The evaluator 405 may thus determine prediction quality measures for elements of the plurality of source images where a prediction quality measure for an element of a first source image is indicative of a difference between predicted pixel values for pixels in the element predicted from the plurality of combined images and pixel values in the first source image for pixels in the element.

The evaluator 405 is coupled to a determiner 407 which is arranged to determine segments of the source images which comprise elements for which the prediction quality measure is indicative of the difference being above a threshold/the prediction quality measure being indicative of a prediction quality being below a threshold.

The segments may correspond to individual elements determined by the evaluator 405 and for which the prediction quality measure is below a quality threshold. However, in many embodiments, the determiner 407 may be arranged to generate segments by grouping such elements, and indeed the grouping may also include some elements for which the prediction quality measure is above the threshold.

For example, in some embodiments, the determiner 407 may be arranged to generate segments by grouping all adjacent elements that have a prediction quality measure below a quality threshold (henceforth referred to as low prediction quality measures and low quality elements respectively).

In other embodiments, the determiner 407 may e.g. be arranged to fit segments of a given size and shape to the images such that they include as many low quality elements as possible.

The determiner 407 accordingly generates a set of segments which include the low quality elements, and thus which cannot be sufficiently accurately predicted from the combined images. Typically, the segments will correspond to a low proportion of the source images and thus to a relatively small amount of image data and pixels.

The determiner 407 and the combined image generator 403 are coupled to an image signal generator 409 which receives the combined images and the segments. The image signal generator 409 is arranged to generate an image signal which comprises image data representing the combined images and image data representing the segments.

The image signal generator 409 may specifically encode the combined images and the segments and may specifically do this differently and use different algorithms and coding standards for the combined images and for the segments.

Typically, the combined images are encoded using highly efficient image encoding algorithms and standards, or highly efficient video encoding algorithms and standards if the images are frames of a video signal.

The encoding of the segments may typically be less efficient. For example, the segments may be combined into segment images where each image may typically comprise segments from a plurality of source images. Such combined segment images may then be encoded using a standard image or video encoding algorithm. However, due to the mixed and partial nature of such combined segment images, the encoding is typically less efficient than for normal full images.

As another example, due to the sparse nature of the segments, they may not be stored in full frames/images. In some embodiments, the segments may for example be represented as meshes in 3D space using VRML (Virtual Reality Modeling Language).

The image data for the segments may typically be accompanied by meta-data indicative of the origin of the segments, such as e.g. the original image coordinates and the camera/source image origin.

The image signal is in the example transmitted to the image signal receiver 500 which is part of the VR client device 101. The image signal receiver 500 comprises an image signal receiver 501 which receives the image signal from the image signal transmitter 400. The image signal receiver 501 is arranged to decode the received image signal to recover the combined images and the segments.

The image signal receiver 501 is coupled to an image processor 503 which is arranged to process the image signal, and specifically the combined images and the segments.

In many embodiments, the image processor 503 may be arranged to synthesize view images for different view poses based on the combined images and segments.

In some embodiments, the image processor 503 may proceed to first synthesize the source images. The parts of the synthesized source messages for which a segment is included in the image signal may then be replaced by the image data of the provided segments. The resulting source images may then be used for conventional image synthesis.

In other embodiments, the combined images and segments may be used directly without first recovering the source images.

It will be appreciated that the image signal transmitter 400 and the image signal receiver 500 comprise required functionality for communicating the image signal including functionality for encoding, modulating, transmitting, receiving etc. the image signal. It will be appreciated that such functionality will depend on the preferences and requirements of the individual embodiment and that such techniques will be known to the person skilled in the art and therefore for clarity and brevity will not be discussed further herein.

Different approaches may be used to generate the combined images in different embodiments.

In some embodiments, the combined image generator 403 may be arranged to generate the combined images by selection of pixels from the source images. For example, for each pixel in a combined image, the combined image generator 403 may select one pixel in one of the source images.

An image and/or depth map comprises pixels having values that may be considered to represent the corresponding image property (light intensity/intensities or depth) of the scene along a ray having a ray direction (orientation) from a ray origin (position). The ray origin is typically the image view pose for the image but may in some representation vary on a pixel basis (such as e.g. for Omni-Directional Stereo where the image as such may be considered to have a view pose corresponding to the center of the Omni-Directional Stereo circle but with each pixel having an individual view pose corresponding to the position on the Omni-Directional Stereo circle). The ray direction may typically vary on a pixel basis, especially for images where all pixels have the same ray origin (i.e. there is a single common image view pose). The ray origin and/or direction are also often referred to as ray pose or ray projection pose.

Thus, each pixel is linked with a position which is the origin of a ray/straight line. Each pixel is further linked with a direction being the direction of the ray/straight line from the origin. Accordingly, each pixel is linked with a ray/straight line which is defined by a position/origin and a direction from this position/origin. The pixel value is given by the appropriate property for the scene at the first intersection of the ray for the pixel and a scene object (including a background). Thus, the pixel value represents a property of the scene along a ray/straight line originating at a ray origin position and having a ray direction associated with the pixel. The pixel value represents a property of the scene along a ray having the ray pose of the pixel.

The combined image generator 403 may thus for a given first pixel in the combined image being generated determine corresponding pixels in the source images as pixels that represents the same ray direction. Corresponding pixels may accordingly be pixel that represent the same ray direction but which may have different positions as the source images may correspond to different positions.

Thus, in principle, the combined image generator 403 may, for a given pixel of the combined image, determine a ray direction and then determine all pixels in the source images that have the same (within a given similarity requirement) ray directions and consider these to be corresponding pixels. Thus, corresponding pixels will typically have the same ray direction but different ray positions/origins.

The views from the different source view pose images may e.g. be re-sampled such that corresponding image coordinates have corresponding ray directions. For example, when the source views are represented in a partial equirectangular projection format, they are resampled to a full 360°/180° version. For example, a view sphere may be defined surrounding the entire view source configuration. This view sphere may be divided into pixels with each pixel having a ray direction. For a given source image, each pixel may be resampled to the view sphere representation by the value of the view sphere pixel for a given ray direction being set to the pixel value for the pixel in the source view that has the same ray direction.

The resampling of the source images onto a full view sphere surface representation will typically result in N partially filled images as the individual images typically have limited viewports and with N being the number of source images. However, the view ports tend to be overlapping and accordingly the set of view sphere surface representations tend to provide multiple pixel values for any given direction.

The combined image generator 403 may now proceed to generate at least one but typically a plurality of combined images by selecting between the corresponding pixels.

Specifically, a first combined image may be generated to cover a part of the scene. For example, a combined image having a predetermined size may be generated to cover a certain area of pixels in the view sphere representations thereby describing this section of the scene. In some embodiments, each of the combined images may cover the entire scene and include the whole view sphere surface.

For each pixel in the first combined image, the combined image generator 403 may now consider the corresponding pixels in the view sphere representations and proceed to select one of the pixels. The combined image generator 403 may specifically generate the first combined image by selecting the pixel value for the combined image as the pixel value for the corresponding pixel in the view source image for which the corresponding pixel represents a ray having the largest distance from the center point in a first direction along a first axis perpendicular to a ray direction for the corresponding pixel.

The distance from the center point to a ray direction may be determined as the distance between the rays of the center point and the corresponding pixel for that pixel of the combined image.

Figure 6:
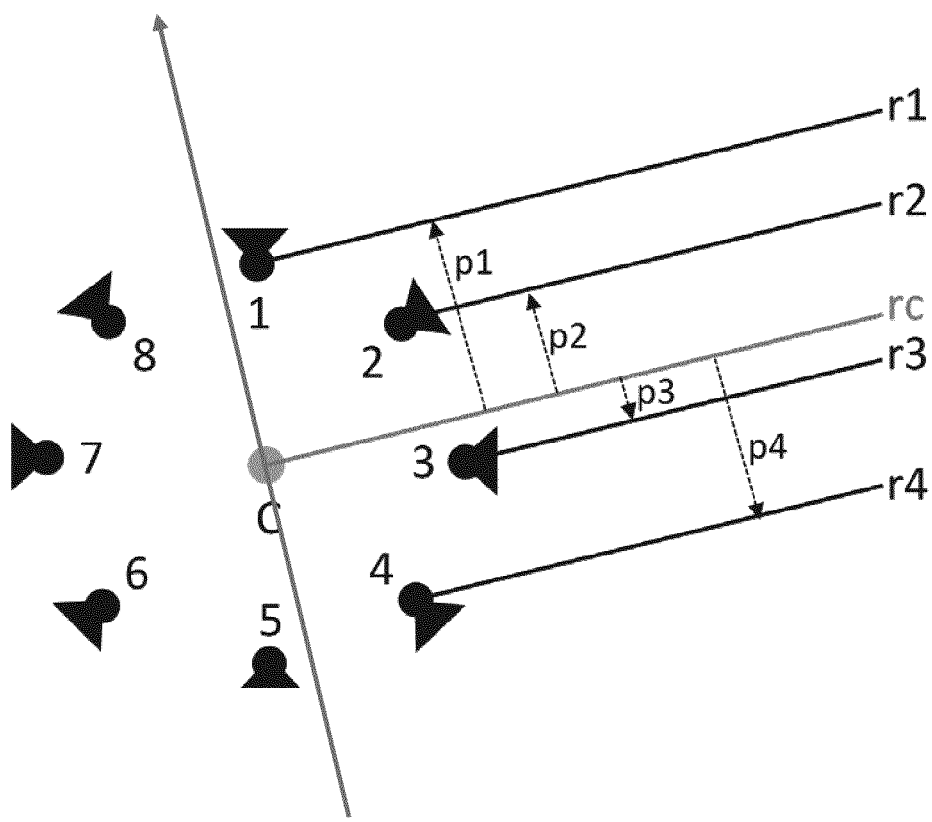
FIG. 6 illustrates an example of pixel selection in accordance with some embodiments of the invention.

The selection may be exemplified by FIG. 6 which is based on the example of a circular source view pose configuration having a center point C.

In the example, the determination of a pixel of a combined image having a ray direction rc is considered. Cameras/source views 1-4 capture this direction and thus four corresponding pixels exist. Each of these corresponding pixels represent a different pose and accordingly represent rays originating at different positions as shown. Accordingly, there is an offset distance p1-p4 between the rays and the ray of the combined image rc, corresponding to the distance between the center point C and the rays when these are extended backwards (to cross the axis 601).

FIG. 6 also shows a direction/axis 601 perpendicular to the ray rc. For a first combined image, the combined image generator 403 may now select the corresponding pixel for which the ray distance in this direction is the largest. Thus, in this case, the combined image pixel value will be selected as the pixel value for camera/view 1 as p1 is the largest distance in this direction.

The combined image generator 403 may typically further proceed to determine a second combined image by performing the same operation but selecting the corresponding pixels that have the largest distance in the opposite direction (it could be considered that generating the first and second combined images may be by selecting the largest positive and negative distance respectively with respect to the first direction if distance is measured as positive when in the same direction as the axis and negative when in the other direction). Thus, in this case, the combined image generator 403 will select the combined image pixel value as the pixel value for camera/view 4 as p4 is the largest distance in this direction.

In many embodiments, the combined image generator 403 may further proceed to generate a third combined image by performing the same operation but selecting the corresponding pixels that have the smallest distance in any direction (the smallest absolute distance). Thus, in this case, the combined image generator 403 will select the combined image pixel value as the pixel value for camera/view 3 as p3 is the smallest distance.

In this way, the combined image generator 403 may thus generate three combined images for the same part of the scene (and possibly for the entire scene). One of the images will correspond to a selection of pixels that provide the most sideways view of the scene from one direction, one that represents the most sideways view of the scene from the opposite direction and one that represents the most central view of the scene. This may be illustrated by FIG. 7 which shows the view directions selected from each view/camera for respectively the center combined image and the two sideways combined images.

The resulting images thus provide a very efficient representation of the scene with one combined image typically providing the best representation for foreground objects and the other two combining to provide background focused data.

In some embodiments, the combined image generator 403 may be arranged to further generate one or more combined images by selecting corresponding pixels according to an axis direction which is perpendicular to the ray direction but is different from the axis direction previously used. This approach may be suitable for non-planar source view pose configurations (i.e. three dimensional configurations). For example, for a spherical source view pose configuration, more than two planes may be considered. For example, a plane at 0, 60 and 120 degrees may be considered, or two orthogonal planes may be considered (e.g. left-right and up-down planes).

In some embodiments, the combined images may be generated by view synthesis/prediction from the source images. The image generator 103 may specifically generate combined images representing views of the scene from different view positions, and specifically from different view positions than those of the source images. Further, in contrast to conventional image synthesis, a combined image is not generated to represent the view of the scene from a single view/capture position but may represent the scene from different view positions even within the same combined image. Thus, a combined image may be generated by generating pixel values for the pixels of the combined image by view synthesis/prediction from the source images but with the pixel values representing different view positions.

Specifically, for a given pixel in the combined image, view synthesis/prediction may be performed to determine the pixel value corresponding to the specific ray pose for that pixel. This may be repeated for all the pixels of the combined image but with at least some of the pixels having ray poses with different positions.

Figure 8:
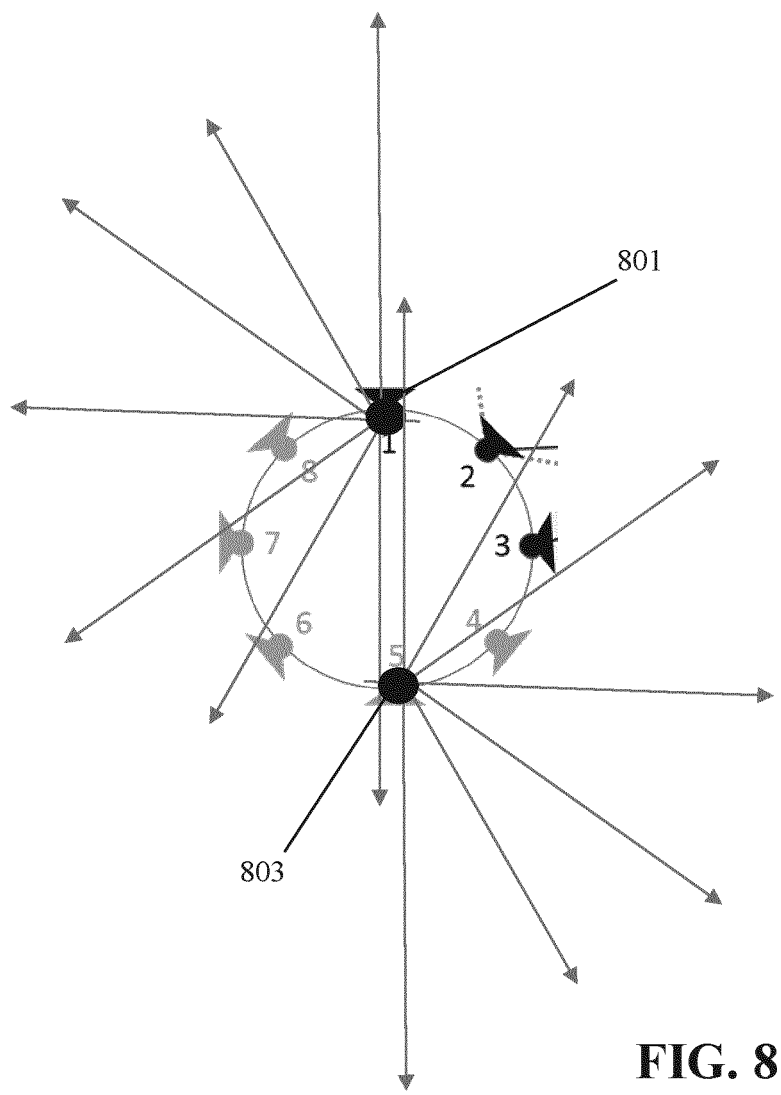
FIG. 8 illustrates an example of elements of a ray pose arrangement for a combined image generated in accordance with some embodiments of the invention.

For example, a single combined image may provide a 360° representation of the scene corresponding e.g. to a surface of a view sphere that surrounds the whole source view pose configuration. However, the views of different parts of the scene may be represented from different positions within the same combined image. FIG. 8 illustrates an example where the combined image comprises pixels representing two different ray positions (and thus pixel view positions), namely a first ray origin 801 which is used for pixels representing one hemisphere and a second ray origin 803 representing the other hemisphere. For each of these ray positions/origins, pixels are provided with different ray directions as shown by the arrows. In the specific example, the source view pose configuration comprises eight source views (1-8) in a circular arrangement. Each camera view only provides a part view, say a 90° view but with an overlap between the views. For a given pixel in the combined image, there may be an associated ray pose, and the pixel value for this ray pose may be determined by view synthesis/prediction from the source views.

In principle, each pixel of the combined image may be individually synthesized but in many embodiments a combined synthesis is performed for a plurality of pixels. For example, a single 180° image may be synthesized for the first position 801 from the view source images (e.g. using positions 2, 1, 8, 7, 6, 5, 4) and a single 180° may be synthesized for the second position 803 from the view source images (e.g. using positions 6, 5, 4, 3, 2, 1, 8). The combined image may then be generated by combining these. If the separately synthesized images are overlapping, combination or blending may be used to generate the combined image. Alternatively, overlapping parts of the combined images may be muted by e.g. assigning a reserved color or depth value. Herby increasing video coding efficiency.

In many embodiments, one or more of the combined images may be generated to represent the scene from a view point providing a more sideways look at the scene. For example, in FIG. 8, the center of the view circle corresponds to the center point of the source view poses and the center of the positions of the ray origins for the combined image. However, the ray directions for a given ray origin 801, 803 are not in a predominantly radial direction but rather provide a sideways view of the scene. Specifically, in the example, both the first ray origin 801 and the second origin 803 provide views in a left-wise direction, i.e. the ray directions for both are to the left when facing the ray origin 801, 803 from the center point.

The image generator 103 may proceed to generate a second combined image which represents a different view of the scene, and specifically may often advantageously generate a second view of the scene which is complementary to the first view but looking in the opposite direction. For example, the image generator 103 may generate a second combined image which uses the same ray origins but where the ray directions are in the opposite direction. For example, the image generator 103 may generate a second combined image corresponding to the configuration of FIG. 9.

The two images may provide a highly advantageous and complementary representation of the scene, and may typically provide improved representation of background parts of the scene.

Figure 10:
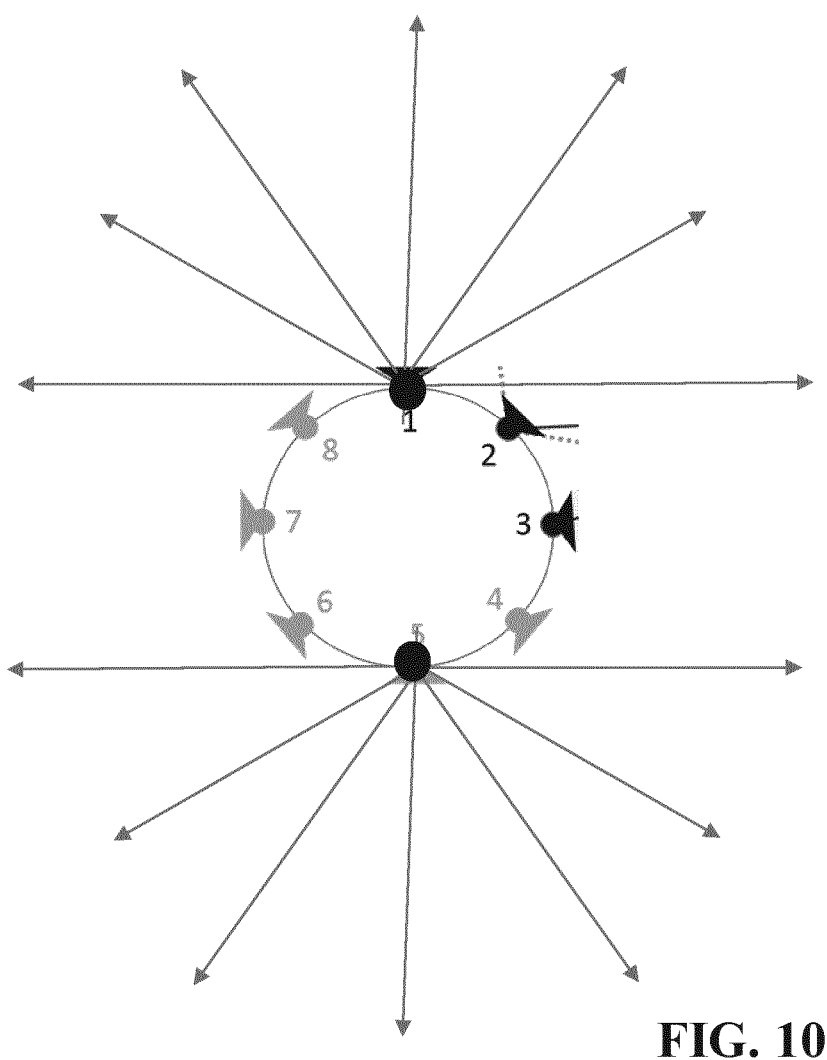
FIG. 10 illustrates an example of elements of a ray pose arrangement for a combined image generated in accordance with some embodiments of the invention.

In many embodiments, the combined image may also include one or more images which is generated to provide a more frontal view, such as e.g. one corresponding to the configuration of FIG. 10. Such an example may provide improved representation of the front of foreground objects in many embodiments.

Figure 11:
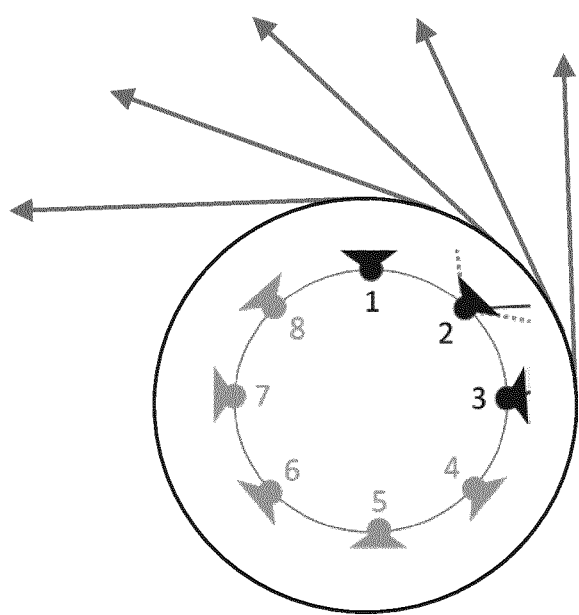
FIG. 11 illustrates an example of elements of a ray pose arrangement for a combined image generated in accordance with some embodiments of the invention.
Figure 12:
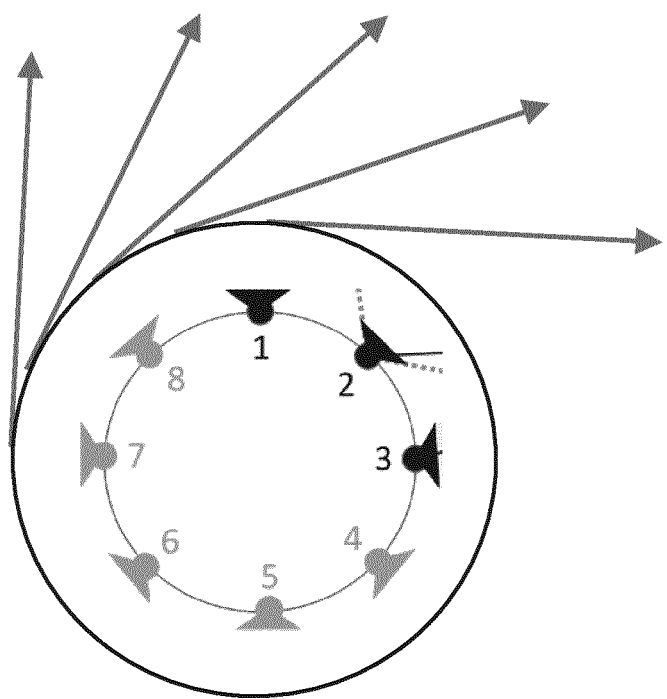
FIG. 12 illustrates an example of elements of a ray pose arrangement for a combined image generated in accordance with some embodiments of the invention.

It will be appreciated that different ray origin configurations may be used in different embodiments and that specifically more origins can be used. For example. FIGS. 11 and 12 show examples of two complementary configurations for generating sideways looking combined images where the ray origins are distributed on a curve (specifically a circle) in this case surrounding the view source configuration (often such a curve would be selected to closely fit the source view pose configuration). The figures only show origins and poses for part of the circle/curve and it will be appreciated that in many embodiments a full spherical or 360° view will be generated.

Figure 7:
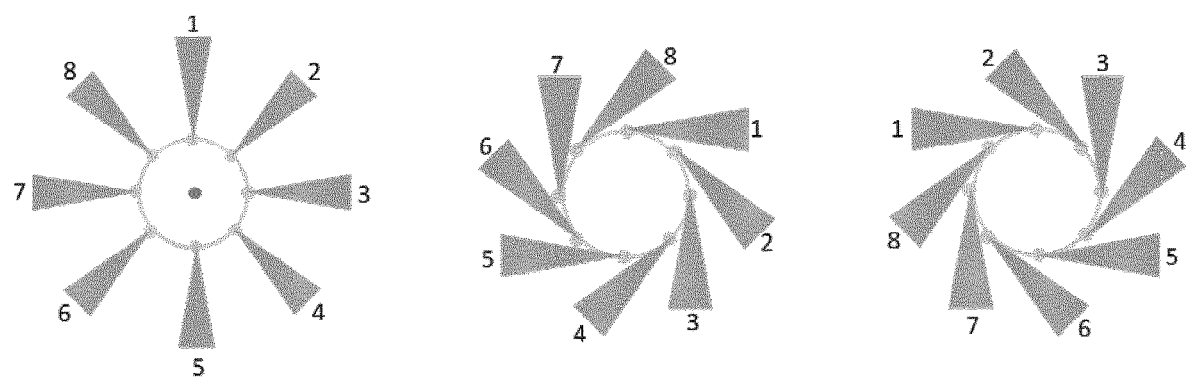
FIG. 7 illustrates an example of pixel selection in accordance with some embodiments of the invention.

FIG. 7 may indeed be considered to illustrate another exemplary configuration where three combined images are generated based on eight ray positions on a circle around a center point. For the first combined image, directions around a radial for circle are selected, for the second image ray directions around a right handed 90° angle is selected, and for the third image, ray directions around a left handed 90° angle is selected. Such a combination of combined images may provide a highly efficient combined representation of a scene.

In some embodiments, the image generator 103 may thus be arranged to generate pixel values for the combined images for specific ray poses by view synthesis from the source images. The ray poses may be selected differently for different combined images.

Specifically, in many embodiments, the ray poses for one image may be selected to provide a sideways view of the scene from the ray origin, and the ray poses of another image may be selected to provide a complementary sideways view.

Specifically, the ray poses may for a first combined image be such that a dot product between a vertical vector and pixel cross product vectors is non-negative for at least 90% (sometimes 95% or even all) of pixels of the first combined image. The pixel cross product vector for a pixel is determined as a cross product between a ray direction for a pixel and a vector from a center point for the different source view poses to a ray position for the pixel.

The center point for the source view poses may be generated as an average or mean position for the source view poses. For example, each coordinate (e.g. x, y, z) may be individually averaged and the resulting average coordinate may be the center point. It should be noted that the center point for a configuration is not (necessarily) at the center of a smallest circle/sphere comprising the source view poses.

The vector from the center point to the ray origin for a given pixel is thus a vector in scene space which defines a distance and direction from the center point to the view position for that pixel. The ray direction may be represented by a(ny) vector that has the same direction, i.e. it may be a vector from the ray origin towards the scene point represented by the pixel (and may thus also be a vector in scene space).

The cross product between such two vectors will be perpendicular to both. For a horizontal plane (in the scene coordinate system), a ray direction towards the left (seen from the center point) will result in a cross product vector which has an upwards component, i.e. having a positive z-component in an x,y,z scene coordinate system where z indicates height. The cross product vector will be upwards for any left-wise view regardless of the ray origin, for example it will be upwards for all pixels/ray poses of FIG. 8.

Figure 9:
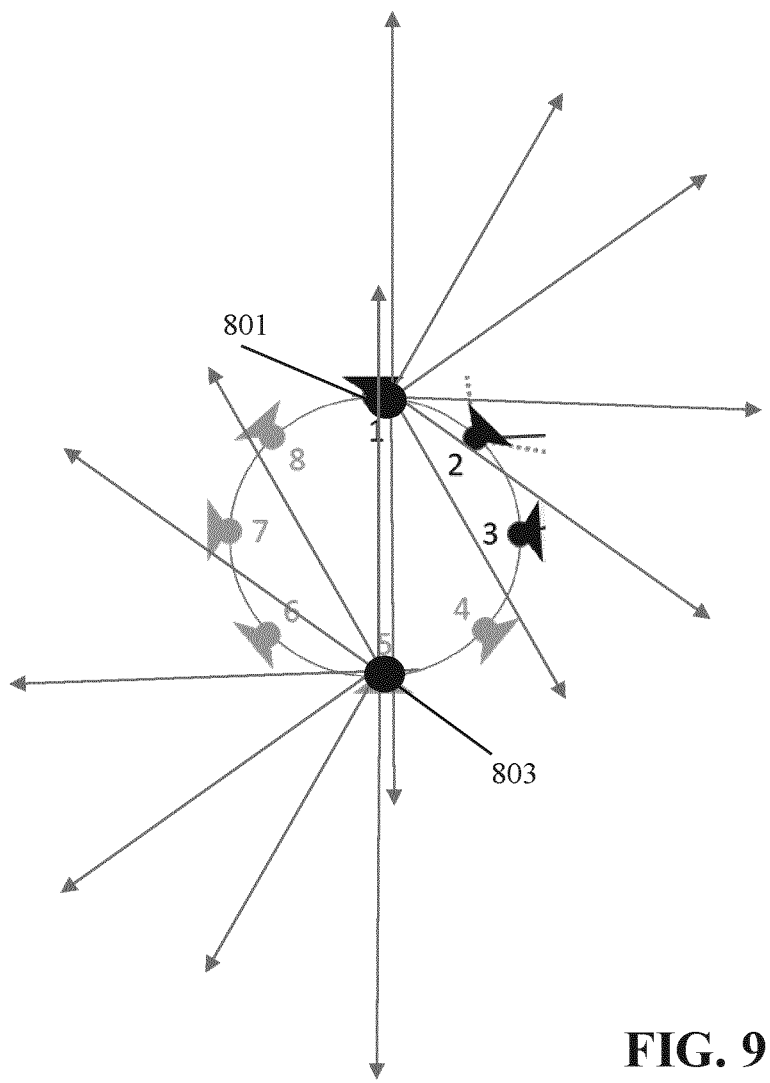
FIG. 9 illustrates an example of elements of a ray pose arrangement for a combined image generated in accordance with some embodiments of the invention.

Conversely, for a right-wise view, the cross product vector will be downwards for all ray poses, e.g. a negative z-coordinate will result for all pixels/ray poses of FIG. 9.

The dot product between a vertical vector in scene space and all vectors having a positive z-coordinate will be the same, specifically it will be positive for an upwards pointing vertical vector and negative for a downwards pointing vertical vector. Conversely, for a negative z-coordinate, the dot product will be negative for an upwards pointing vertical vector and positive for a downwards pointing vertical vector. Accordingly, the dot product will have the same sign for right-wise ray poses and the opposite sign for all left-wise ray poses.

In some scenarios, a null vector or dot product may result (e.g. for polar points on a view circle) and for such ray poses, the sign will not be different from either left-wise or right-wise views.

It will be appreciated that the above considerations also apply, mutatis mutandis, to a three dimensional representation, such as e.g. where the ray origins are positioned on a sphere.

Thus, in some embodiments, at least 90%, and in some embodiments at least 95% or even all pixels of a combined image result in a dot product that does not have different signs, i.e. at least that many pixels will have a sideways view to the same side.

In some embodiments, the combined images may be generated to have guard bands or e.g. some specific edge pixels may have specific circumstances for which the dot product may potentially not meet the requirement. However, for the vast majority of the pixels, the requirement is met, and the pixels provide corresponding sideways views.

Further, in many embodiments, at least two combined images meet these requirements but with the signs of the dot products being opposite. Thus, for one combined image, at least 90% of the pixels may represent a right-wise view and for another combined image at least 90% of the pixels may represent a left-wise view.

The combined images may be generated for poses that provide a particularly advantageous view of the scene. The Inventors have realized that in many scenarios, it may be particularly advantageous to generate combined images for view poses that result in a more sideways view of the main part of the scene, and further that for a given configuration of the source views, it may be advantageous to generate at least some views that are close to the extreme positions of the configuration rather than close to the center of the configuration.

Thus, in many embodiments, at least one, and typically at least two, of the combined images are generated for ray poses that are proximal to the border of a region corresponding to the source view pose configuration.

The region may specifically be a region of space (a collection or set of points in space), which is bounded by a largest polygon that can be formed using at least some of the view positions as vertices for the straight lines of the polygon. The polygon may be a plane figure that is bounded by a finite chain of straight line segments closing in a loop to form a closed chain or circuit, and this may include a one dimensional configuration such as that of FIG. 2A (also known as a degenerate polygon). For a three dimensional configuration, the region may correspond to a largest possible polyhedron formed by at least some of the source view positions. Thus, the region may be a largest polygon or polyhedron that can be formed using at least some of the source view positions as vertices for the lines of the polygon or polyhedron.

As an alternative, a region comprising the different view poses of the plurality of source images may be a smallest line, circle, or sphere including all view positions. The region may specifically be a smallest sphere that includes all source view positions.

Thus, in many embodiments, the ray poses of at least one of the combined images are selected to be close to the border of the region comprising the source view pose configuration.

In many embodiments, at least one ray position of the combined images is determined to be less than a first distance from the border of the region where this first distance is no more than 50% or in many cases 25% or 10% of the maximum (interior) distance between points on the border of the region. Thus, from the position of the view pose, a minimum distance to the border may be no more than 50%, 25% or 10% of a maximum distance to the border.

Figure 13:
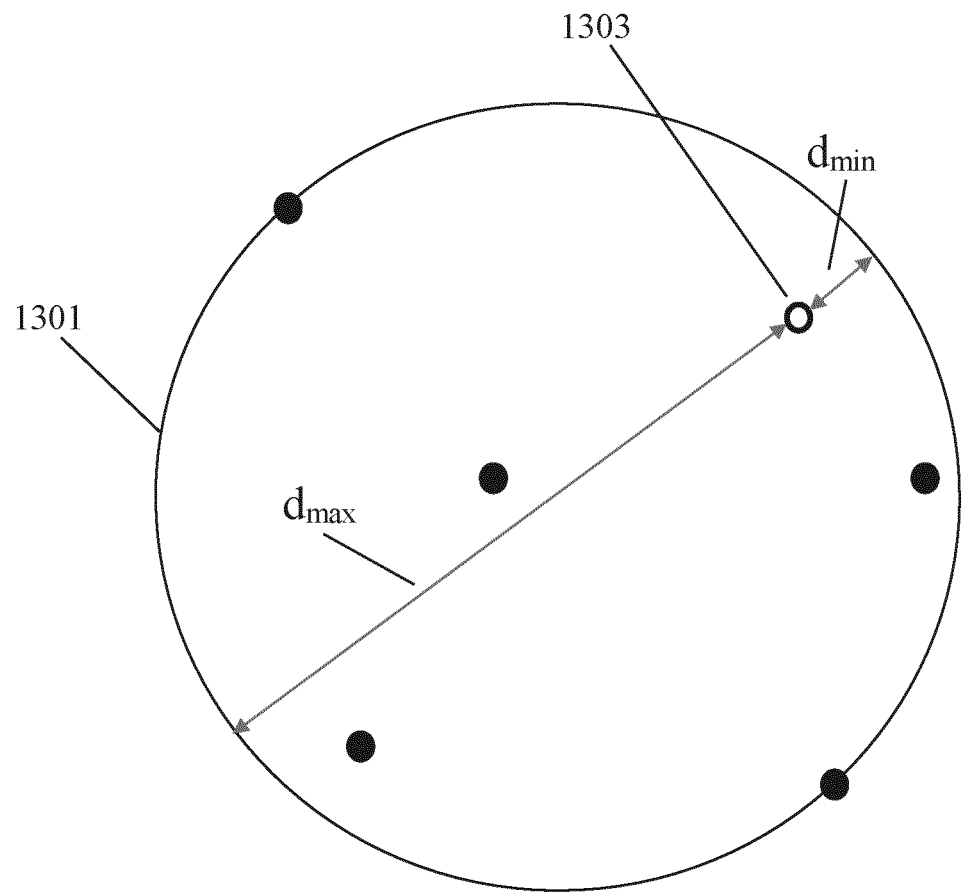
FIG. 13 illustrates an example of elements of a ray pose arrangement for a combined image generated in accordance with some embodiments of the invention.

This may be illustrated by FIG. 13 which shows an example of source viewpoints indicated by black dots. FIG. 13 further illustrates a region corresponding to the smallest sphere that includes the view poses. In the example, the view configuration is a planar, two dimensional configuration and the considering of a sphere reduces to a consideration of a circle 1301. FIG. 13 further shows a ray pose 1303 for a combined image which is proximal to the border of the sphere/circle/region. Specifically, the minimum distance dmin to the border/edge of the region is much smaller (about 10%) of the maximum distance dmax to the border/edge of the region.

In some embodiments the ray poses of a combined image may be determined to be less than a first distance from the border of the region where the first distance is no more than 20%, or often even 10% or 5% of the maximum distance between two source view poses. In the example where the region is determined as the smallest sphere/circle including all the source view poses, the maximum distance between two view poses is equal to the diameter of the sphere/circle, and thus the combined image view pose may be selected such that the minimum distance dmin meets this requirement.

In some embodiments the ray poses of a combined image may be determined to be at least a minimum distance from a center point of the different view poses where the minimum distance is at least 50%, and often even 75% or 90%, of the distance from the center point to the border along a line through the center point and the ray pose.

In some embodiments, two view poses for the combined images are selected such that a distance between these is at least 80%, and sometimes even 90% or 95%, of the maximum distance between two points of a border intersecting a line through the two view poses. For example, if a line is drawn through the two poses, the distance between the two poses is at least 80%, 90% or 95% of the distance between the points at which the line crosses the circle.

In some embodiments, a maximum distance between two of the ray poses of the first combined image is at least 80% of a maximum distance between points of the border of a region comprising the different view poses of the plurality of source images.

The Inventors have had the insight that the approach of generating combined images for positions close to the border/edge of the region comprising the source view poses may be particularly advantageous as it tends to provide increased information of background objects in the scene. Most background data is typically captured by the cameras or image areas that have most the sideway distance with respect to a central viewpoint. This may be advantageously combined with a more central combined image as this tends to provide improved image information for foreground objects.

In many embodiments, the image signal generator 409 may be arranged to further include metadata for the generated image data. Specifically, the combined image generator 403 may generate origin data for the combined images where the origin data indicates which of the source images is the origin for the individual pixels in the combined images. The image signal generator 409 may then include this data in the generated image signal.

In many embodiments, the image signal generator 409 may include source view pose data indicative of the view poses for the source images. The data may specifically include data defining the position and direction for each source image/view.

The image signal may accordingly comprise metadata that indicates, possibly individually for each pixel, the position and direction for which the pixel values are provided. i.e. a ray pose indication. Accordingly, the image signal receiver 500 may be arranged to process this data to perform e.g. view synthesis.

For example, for each pixel of the three views generated by selection of corresponding pixels, metadata may be included indicating the source view identity. This may result in three label maps, one for the center-view and two for the sideways views. The labels may then further be linked to specific view pose data including e.g. the camera optics and rig geometry.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The Described Approach May Provide:

An apparatus for generating an image signal, the apparatus comprising:
 a receiver (401) for receiving a plurality of source images representing a scene from different view poses;
 a combined image generator (403) for generating a plurality of combined images from the source images, each combined image being derived from a set of at least two source images of the plurality of source images, each pixel of a combined image representing the scene for a ray pose and the ray poses for each combined image including at least two different positions;
 an evaluator (405) for determining prediction quality measures for elements of the plurality of source images, a prediction quality measure for an element of a first source image being indicative of a difference between pixel values in the first source image for pixels in the element and predicted pixel values for pixels in the element, the predicted pixel values being pixel values resulting from prediction of pixels in the element from the plurality of combined images;
 a determiner (407) for determining segments of the source images comprising elements for which the prediction quality measure is indicative of a difference above a threshold; and
 an image signal generator (409) for generating an image signal comprising image data representing the combined images and image data representing the segments of the source images.

An apparatus for receiving an image signal, the apparatus comprising:
 a receiver (501) for receiving an image signal, the image signal comprising: a plurality of combined images, each combined image representing image data derived from a set of at least two source images of a plurality of source images representing a scene from different view poses, each pixel of a combined image representing the scene for a ray pose and the ray poses for each combined image including at least two different positions;
 image data for a set of segments of the plurality of source images, a segment for a first source image comprising at least one pixel of the first source image for which a prediction quality measure for a prediction of the segment from the plurality of combined images is below a threshold; and
 a processor (503) for processing the image signal.

A method of generating an image signal, the method comprising:
 receiving a plurality of source images representing a scene from different view poses;
 generating a plurality of combined images from the source images, each combined image being derived from a set of at least two source images of the plurality of source images, each pixel of a combined image representing the scene for a ray pose and the ray poses for each combined image including at least two different positions;
 determining prediction quality measures for elements of the plurality of source images, a prediction quality measure for an element of a first source image being indicative of a difference between pixel values in the first source image for pixels in the element and predicted pixel values for pixels in the element, the predicted pixel values being pixel values resulting from prediction of pixels in the element from the plurality of combined images;
 determining segments of the source images comprising elements for which the prediction quality measure is indicative of a difference above a threshold; and
 generating an image signal comprising image data representing the combined images and image data representing the segments of the source images.

A method of processing an image signal, the method comprising:
 receiving an image signal, the image signal comprising:
 a plurality of combined images, each combined image representing image data derived from a set of at least two source images of a plurality of source images representing a scene from different view poses, each pixel of a combined image representing the scene for a ray pose and the ray poses for each combined image including at least two different positions; image data for a set of segments of the plurality of source images, a segment for a first source image comprising at least one pixel of the first source image for which a prediction quality measure for a prediction of the segment from the plurality of combined images is below a threshold; and
 processing the image signal.

An image signal comprising a plurality of combined images, each combined image representing image data derived from a set of at least two source images of a plurality of source images representing a scene from different view poses, each pixel of a combined image representing the scene for a ray pose and the ray poses for each combined image including at least two different positions; image data for a set of segments of the plurality of source images, a segment for a first source image comprising at least one pixel of the first source image for which a prediction quality measure for a prediction of the segment from the plurality of combined images is below a threshold.

The features of subclaims may apply to these approaches.

The invention claimed is:

1. An apparatus for generating an image signal, the apparatus comprising:
 a receiver circuit,
  wherein the receiver circuit is arranged to receive a plurality of source images, and wherein the plurality of source images represent a scene from at least two view poses, a combined image generator circuit,
wherein the combined image generator circuit is arranged to generate a plurality of combined images from the plurality source images,
wherein each combined image is derived from at least two source images,
wherein each combined image comprises a plurality of pixels,
wherein each pixel of the plurality of pixels represents the scene for a ray pose of a plurality of ray poses, and
wherein a ray pose for a pixel represents a pose for a ray in a view direction for the pixel and from a view position for the pixel;

an evaluator circuit wherein the evaluator circuit is arranged to determine a prediction quality measure for at least one element of at least a first source image of the plurality of source images,
wherein the at least one element comprises at least one pixel,
wherein the prediction quality measure for the at least one element of the first source image is inversely indicative of a difference between pixel values in the at least one first element of the first source image and predicted pixel values for pixels in the at least one first element, and
wherein the predicted pixel values result from a prediction of pixels in a corresponding at least one element of at least two combined images;

a determiner circuit,
wherein the determiner circuit is arranged to determine low-quality segments of the at least one source image,
wherein the low-quality segments comprise elements of the at least one source image for which the prediction quality measure is below a threshold; and an image signal generator circuit,
wherein the image signal generator circuit is arranged to generate an image signal,
wherein the image signal comprises first image data and second image data,
wherein the first image data represents the combined images,
wherein the second image data represent the low-quality segments, and
wherein an encoding of the combined images to form the first image data differs from an encoding of the low-quality segments to form the second image data.

2. The apparatus of claim 1,
wherein the plurality of combined images comprise a first combined image,
wherein the first combined image comprises first pixels, and
wherein the combined image generator circuit is arranged to generate the first combined image using view synthesis of the first pixels from the plurality of source images.

3. The apparatus of claim 2,
wherein a dot product between a vertical vector and at least one pixel cross product vectors is non-negative for at least 90% of the first pixels,
wherein a pixel cross product vector for each of the first pixels is a cross product between a ray direction for a pixel and a vector from a center point, and wherein the center point is between at least two view poses of the plurality of source images.

4. The apparatus of claim 3,
wherein the plurality of combined images comprises a second combined image,
wherein the second combined image comprises second pixels,
wherein the combined image generator circuit is arranged to generate the second combined image using view synthesis of the second pixels from the source images, and
wherein a dot product between a vertical vector and pixel cross product vectors is non-positive for at least 90% of the second pixels.

5. The apparatus of claim 2, wherein each of the first ray poses are selected to be proximal to a border of a region comprising the at least two view poses of the plurality of source images.

6. The apparatus of claim 2,
wherein each of the first ray poses is determined to be less than a first distance from a border of a region,
wherein the border of the region comprises the at least two view poses of the plurality of source images, and
wherein the first distance is less than or equal to 50% of a maximum interior distance between points on the border.

7. The apparatus of claim 2,
wherein the combined image generator circuit is arranged to determine a first corresponding pixel to each first pixel in each of the view source images for which the first corresponding pixel is present,
wherein the first corresponding pixel is one that represents a same ray direction as the pixel of the first combined image;
wherein the combined image generator circuit is arranged to select a pixel value for each of the first pixels as a pixel value of the first corresponding pixel when the first corresponding pixel represents a ray having a largest distance from a center point for the at least two view poses of the plurality of source images, and
wherein the largest distance is in a first direction along a first axis perpendicular to a ray direction for the first corresponding pixel.

8. The apparatus of claim 7,
wherein determining the corresponding pixels comprises resampling each source image to an image representation,
wherein the image representation represents at least a part of a surface of a view sphere,
wherein the view sphere surrounds the view poses of the plurality of source images, and
wherein determining corresponding pixels comprises determining pixels having a same position in the image representation.

9. The apparatus of claim 7,
wherein the plurality of combined images comprises a second combined image,
wherein the second combined image comprises second pixels,
wherein the combined image generator circuit is arranged to select a pixel value for each of the second pixels as a pixel value of a second corresponding pixel, and
wherein the second corresponding pixel represents a ray having a largest distance from the center point in an opposite direction of the first direction.

10. The apparatus of claim 9,
wherein the plurality of combined images comprises a third combined image,
wherein the second combined image comprises third pixels,
wherein the combined image generator circuit is arranged to select a pixel value for each of the third pixels as a pixel value of a third corresponding pixel, and
wherein the corresponding third corresponding pixel represents a ray having a smallest distance from the center point.

11. The apparatus of claim 7,
wherein the plurality of combined images comprises a second combined image,
wherein the second combined image comprises second pixels,
wherein the combined image generator circuit is arranged to select a pixel value for each of the second pixels as a second corresponding pixel,
wherein the second corresponding pixel represents a ray having a largest distance from the center point in a second direction along a second axis perpendicular to a ray direction for the second corresponding pixel, and
wherein the first axis and the second axis have different directions.

12. The apparatus of claim 7,
wherein the combined image generator circuit is arranged to generate origin data for the first combined image,
wherein the origin data is indicative of which of the source images is an origin for each pixel of the first combined image, and
wherein the image signal generator circuit is arranged to include the origin data in the image signal.

13. The apparatus of claim 1,
wherein the image signal generator circuit is arranged to include source view pose data in the image signal, and
wherein the source view pose data is indicative of the at least two view poses for the source images.

14. An apparatus for receiving an image signal, the apparatus comprising:
a receiver circuit, wherein the receiver circuit is arranged to receive an image signal,
the image signal comprising:
a plurality of combined images,
wherein each of the plurality of combined image represent image data,
wherein the image data is derived from at least two source images,
wherein the at least two source images are a portion of a plurality of source images,
wherein the plurality of source images represent a scene from at least two view poses,
wherein each pixel of any combined image represents the scene for a ray pose of a plurality of ray poses,
wherein a ray pose for a pixel represents a pose for a ray in a view direction for the pixel and from a view position for the pixel; and
image data for a set of low-quality segments of the plurality of source images,
wherein at least one low-quality segment of a first source image comprises at least one pixel of the first source image,
wherein the low-quality segment has a prediction quality measure that is below a threshold,
wherein the prediction quality measure is inversely indicative of a difference between pixel values in the first source image and predicted pixel values for pixels in the first source image, and
wherein the predicted pixel values result from a prediction of pixel values based on at least two of the combined images; and
a processor circuit,
wherein the processor circuit is arranged to process the image signal,
wherein the processor circuit is arranged to decode the combined images using a first decoding process,
wherein the processor circuit is arranged to decode the image data for the set of low-quality segments using a second decoding process, and
wherein the first decoding process is different from the second decoding process.

15. A method of generating an image signal, the method comprising:
receiving a plurality of source images, wherein the plurality of source images represent a scene from at least two view poses;
generating a plurality of combined images from the source images,
wherein each combined image is derived from at least two source images,
wherein each combined image comprises a plurality of pixels,
wherein each pixel of the plurality of pixels represents the scene for a ray pose, and
wherein a ray pose for a pixel represents a pose for a ray in a view direction for the pixel and from a view position for the pixel;
determining prediction quality measures for elements of the plurality of source images,
wherein a prediction quality measure for at least one element of a first source image is inversely indicative of a difference between pixel values in the first source image for pixels in the element and predicted pixel values for pixels in the element,
wherein the predicted pixel values are pixel values resulting from prediction of pixels in the element from at least two combined images;
determining low-quality segments of the first source image, wherein the low-quality segments comprise one or more elements for which the prediction quality measure is below a threshold; and
generating an image signal,
wherein the image signal comprises first image data and second image data,
wherein the first image data represents the combined images,
wherein the second image data represents the low-quality segments,
wherein the first image data corresponds to a first encoding of the combined images,
wherein the second image data corresponds to a second encoding of the low-quality segments, and
wherein the first encoding is different from the second encoding.

16. A method of processing an image signal, the method comprising:
receiving an image signal,
the image signal comprising first image data and second image data,
wherein the first image data represents a plurality of combined images,
wherein each of the plurality of combined image represent image data, wherein the image data is derived from at least two source images, wherein the at least two source images are a portion of a plurality of source images, wherein the plurality of source images represent a scene from at least two view poses, wherein each pixel of any combined image represents the scene for at least one ray pose, wherein a ray pose for a pixel represents a pose for a ray in a view direction for the pixel and from a view position for the pixel, wherein the second image data represents at least one low-quality segment, wherein the at least one low-quality segment corresponds to one or more elements of a first source image having a prediction quality measure that is below a threshold, wherein the prediction quality measure is inversely indicative of a difference between pixel values in the first source image for pixels in the element and predicted pixel values for pixels in the element, and wherein the predicted pixel values are pixel values resulting from prediction of pixels in the element from at least two combined images; and processing the image signal, wherein processing the image signal comprises decoding the first image data using a first decoding process, wherein processing the image signal comprises decoding the second image data using a second decoding process, and wherein the first decoding process is different from the second decoding process.

17. A non-transitory computer-readable medium comprising a computer program, wherein the computer program, when executed on a processor, performs the method as claimed in claim 15.

18. A non-transitory medium computer-readable medium comprising a computer program, wherein the computer program, when executed on a processor, performs the method as claimed in claim 16.

19. The apparatus of claim 8, wherein the plurality of combined images comprises a second combined image, wherein the second combined image comprises second pixels, wherein the combined image generator circuit is arranged to select a pixel value for each of the second pixels as a pixel value of the corresponding pixel, and wherein the corresponding pixel represents a ray having a largest distance from the center point in an opposite direction of the first direction.

* * * * *